Sept. 16, 1941.  R. W. WOOD  2,256,005
CONVEYER
Filed Nov. 18, 1940  2 Sheets-Sheet 1

INVENTOR
Robert W. Wood,
BY
ATTORNEYS

Sept. 16, 1941.   R. W. WOOD   2,256,005
CONVEYER
Filed Nov. 18, 1940   2 Sheets-Sheet 2

INVENTOR
Robert W. Wood,
BY
ATTORNEYS

Patented Sept. 16, 1941

2,256,005

UNITED STATES PATENT OFFICE 2,256,005

CONVEYERS

Robert W. Wood, Detroit, Mich.

Application November 18, 1940, Serial No. 366,049

2 Claims. (Cl. 104—172)

The present invention pertains to a novel conveyer of the endless chain type, being especially adapted for use in industries such as dairies, or other bottle washing or filling plants, in automobile assembly units, in the baking of enamelled products, the baking and glazing of clay products, and innumerable other methods of progressive production wherein it is necessary to convey containers from one department to another. It has especial utility at receiving departments in various industries inasmuch as it facilitates the quick removal of the received goods from the unloading platform or for carrying the goods to be shipped away to the loading platform. The conveyer in adapting itself for this service must pass from one department to another and in so doing must be threaded around corners and must vary considerably from a horizontal plane.

The primary object of the present invention is to devise a conveyer including a chain and mechanism for supporting the same in a manner permitting the conveyer to round a corner with a comparatively small radius of curvature and which can be inclined upwardly or downwardly in order to meet the requirements of the industry in which it serves.

Another object of the present invention is to devise a conveyer in which the propelling chain and mechanism therefor is readily accessible for cleaning or flushing with a hose.

With the above and other ends in view the invention consists in matters hereinafter set forth and more particularly pointed out in the appended claims, reference being had to the accompanying drawings, in which Figure 1 is a top plan view of two links of the present conveyer chain joined together;

Like characters of reference are employed throughout to designate corresponding parts.

Figure 1:
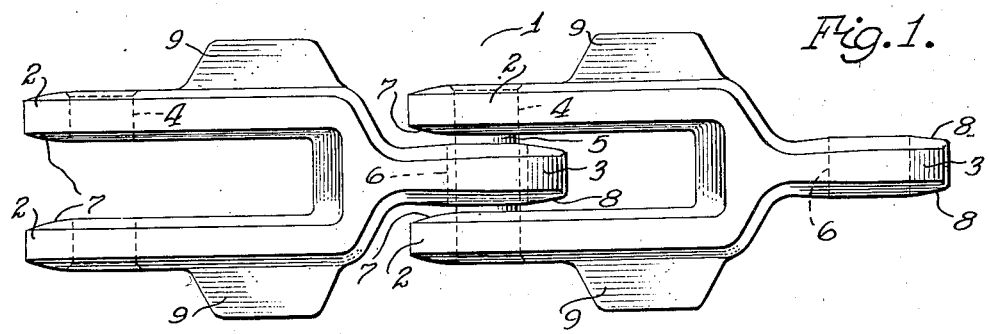
Figure 2:
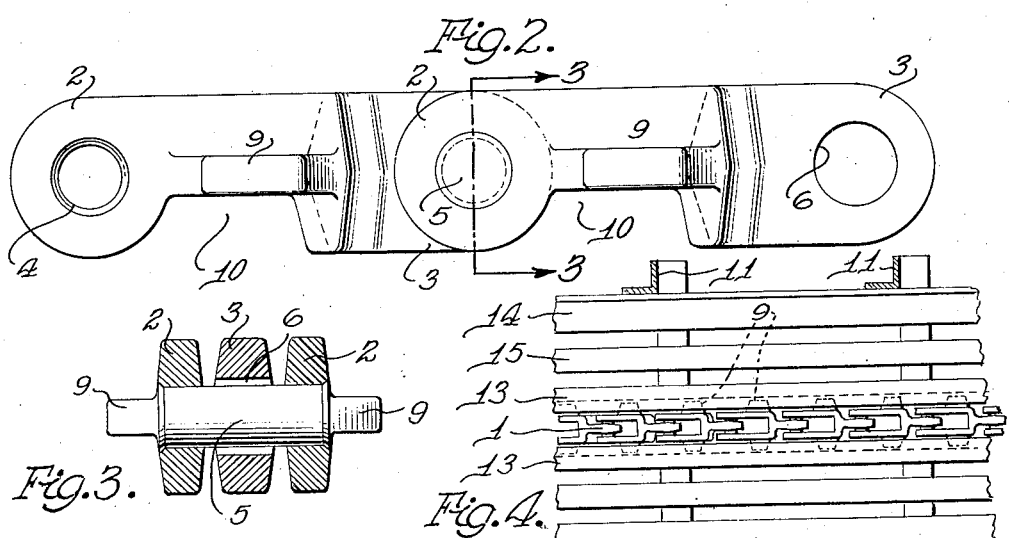
Fig. 2 is a side elevation thereof.
Figure 3:
Fig. 3 is a transverse cross sectional view of the links taken substantially along the line 3—3 of Fig. 2.
Figure 4:
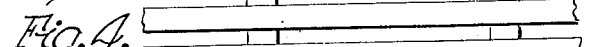
Fig. 4 is a fragmentary plan view of the conveyer chain and the supporting mechanism therefor.
Figure 5:
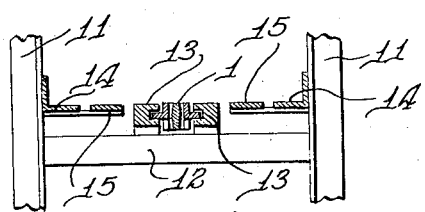
Fig. 5 is a fragmentary transverse cross sectional view through the conveyer and supporting structure.

The numeral 1 indicates in general the chain formed of a series of links, each link being bifurcated to form a pair of arms 2. Projecting outwardly from the end of the link opposite to said arms is a finger 3. The arms 2 are provided with bores 4 which receive the ends of a pin 5 and the finger 3 is provided with an opening 6 through which the pin 5 passes when the links are assembled together. The assembly of the links is clearly illustrated in Figs. 1, 2 and 3 which illustrates the finger 3 received between the arms 2 and held in this relative position by the pin 5.

It will be noted, however, that the arms 2 are spaced apart a distance that results in considerable clearance on each side of the finger 3 when it is inserted therebetween and that the opening 6 in the finger 3 is of a diameter great enough to result in considerable clearance around the pin 5. The ends of the arms 2 are cut away as at 7 and the finger 3 is slightly tapered at its outer extremity as indicated by the numeral 8 and these tapered parts and cut away parts when combined with the above described clearances results in a universal connection between the links within certain limits. The amount of the universal movement of the links relative to each other is governed by the amount of clearance between the finger 3 and the arms 2 and the amount of clearance between the opening 6 and pin 5. The universal movement permits the chain to bend on a plane parallel to a horizontal plane or to bend at an angle to a horizontal plane.

Each of the arms 2 has an outwardly projecting side flange 9 and the portion of the arms 2 which would ordinarily project beneath the flange is cut away as at 10. The utility of these two features will become apparent as the description progresses.

The supporting structure for the inclined portion of the present conveyer includes vertical standards 11 that are joined together by cross members 12. Mounted upon the cross members 12 are spaced channel members 13 between which the chain 1 is received so that the side flanges 9 on the arms 2 project into the channel members. Angle irons 14 are mounted above the cross members 12 on the upright standards 11 and strap members 15 are supported by said angle irons.

Figures 7, 8:
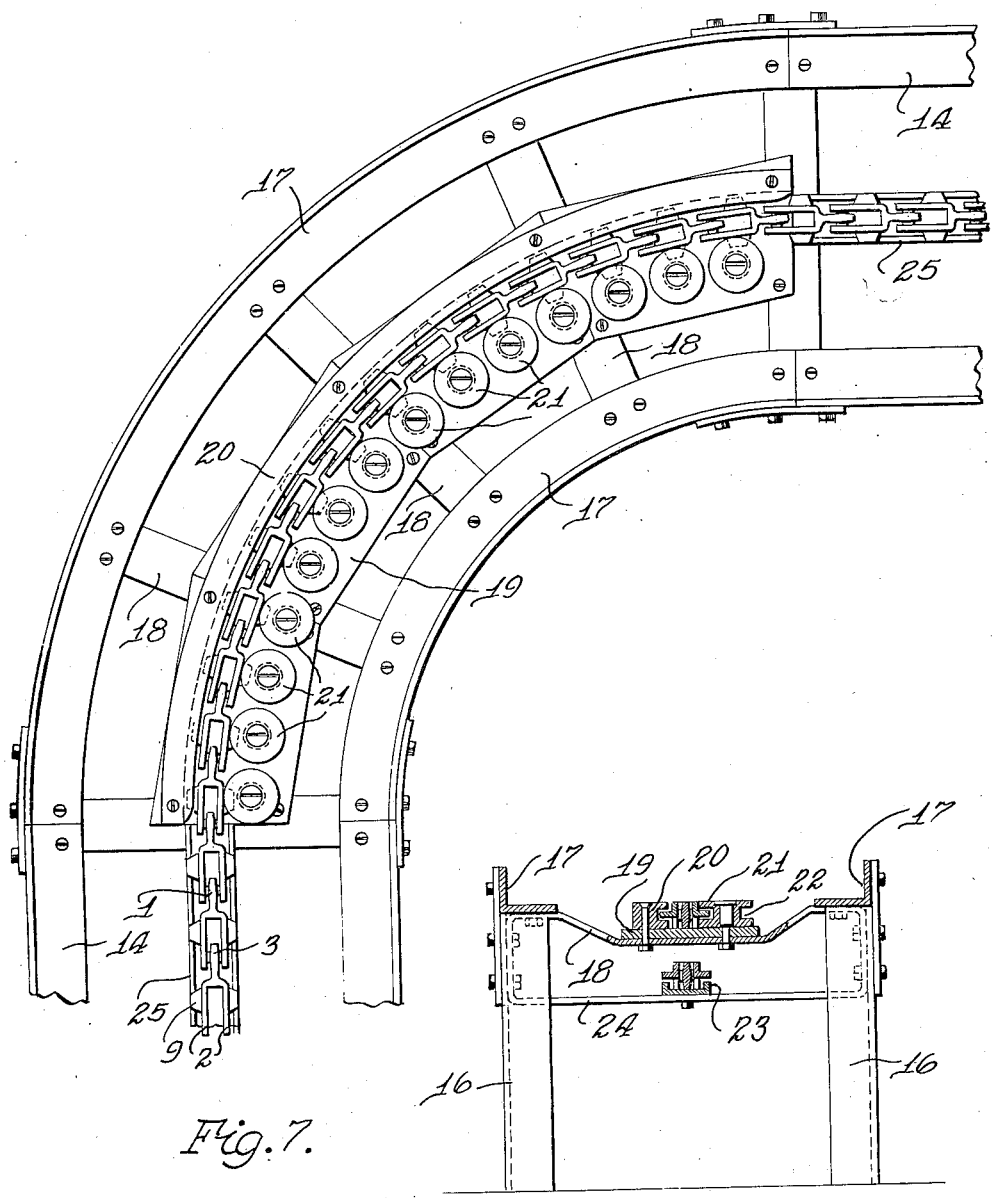
Fig. 7 is a fragmentary plan view of the conveyer, illustrating the manner in which it is curved around a corner.
Fig. 8 is a cross sectional view thereof.

In Figs. 7 and 8 the structure for training the conveyer around a corner is illustrated and it comprises vertical standards 16 with angle irons 17 secured upon the top thereof. A cross member 18 supports a plate 19 upon the outside of which is mounted a curved channel member 20. Uniformly spaced from the channel 20 are a series of rollers 21 having grooves 22 formed therein. The flanges 9 and the arms 2 of the chain 1 are received in the channel 20 and pass through the grooves 22 in the rollers.

Fig. 8 illustrates the manner in which the conveyer chain returns beneath the conveyer, a channel 23 being supported by a cross member 24 so that the chain 1 slides along said channel. Along the straight level stretches of the conveyer the chain is supported in a manner similar to this, a channel 25 being supported by the cross members 12 for the chain to slide in.

Figure 6:
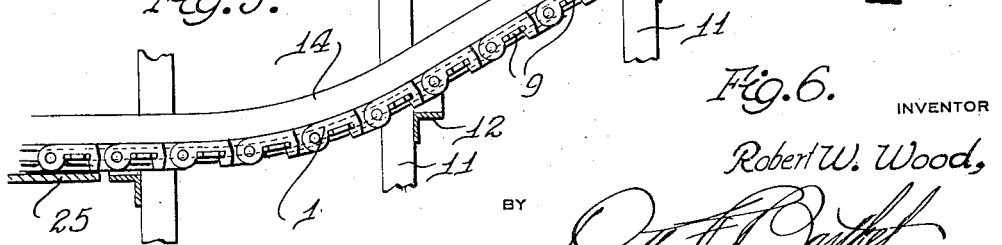
Fig. 6 is a longitudinal cross sectional view of the conveyer, illustrating the manner in which it may be inclined relative to a horizontal plane.

In operating the conveyer, boxes, cases and various other articles and containers rest in the angle irons 14 and 17, and on the strap members 15. Projecting hooks are then hooked onto the chain 1 and engage the edge of the article to slide it along the angle irons. As illustrated in Fig. 6 the conveyer is inclined relative to a horizontal plane and the tendency is for the chain to straighten as a result of the driving stress thereon. The chain in this case would raise itself away from the angle irons and possibly cause the containers thereon to be upset. This possibility is avoided however by the provision of the spaced channel members 13 that receive the ears on the chain and thereby cause it to curve at the top and bottom of the incline, the curvature of the chain at these points being identical with the curvature of the angle irons 13 that support the weight of the article or container to be conveyed.

When the conveyer chain is trained around a flat horizontal curve the curvature of the chain is at right angles to the above described and the tendency in this case is for the chain to striaghten in the same manner as a result of the driving stress. The rollers 21 however, hold the chain to the turn and reduce the amount of friction on the turn, it being obvious that the tendency of the chain to straighten causes the entire driving stress to be thrown against the inside supporting member at the turn, the provision of rollers however reduces the amount of friction to a minimum. To avoid possibility of the chain twisting at the curve there is provided the channel member 20 to receive the flanges 9 on the chain.

The above described curve is permitted by the fact that the present chain is provided with a clearance on each side of the finger 3 and a clearance around the pin 5. The open construction combined with the cut away portions 10 of the links permits thorough cleansing of the device by flushing with water.

Although a specific embodiment of the present invention has been illustrated and described it is to be understood that various changes may be made within the scope of the claims without departing from the spirit of the invention, and such changes are contemplated.

What I claim is:

1. A device of the character described comprising links formed with spaced arms and a projecting finger, a pin for securing the finger of one link between the spaced arms of the next adjacent link, said finger being of lesser width than the space between said arms and being tapered adjacent its end, said arms being tapered adjacent their ends, said pin being of smaller cross section than the opening in the said finger through which it passes, outwardly projecting flanges formed on said arms, and a supporting structure including grooved members into which said flanges project.

2. A conveyer comprising links formed with spaced arms and a projecting finger, a pin for securing the finger of one link between the spaced arms of the next adjacent link, said finger being of lesser width than the space between said arms, said pin being of smaller cross section than the opening in the said finger through which it passes, outwardly projecting flanges formed on said arms, longitudinally grooved members into which said flanges project, and a plurality of rollers along a curved portion of said conveyer engaging the side of said links and having grooves into which said flanges project.

ROBERT W. WOOD.